July 28, 1959 F. J. ZARNOWSKI Re. 24,675
AWNINGS
Original Filed April 29, 1954 2 Sheets-Sheet 1
Fig 1
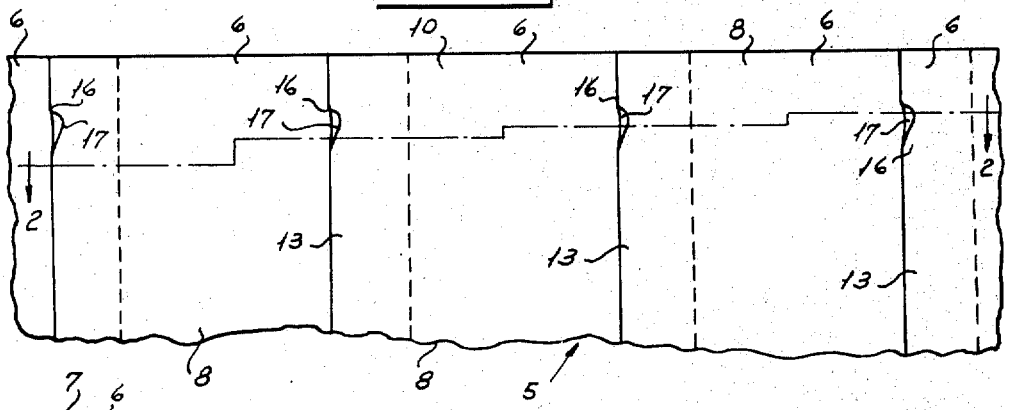
Fig 2
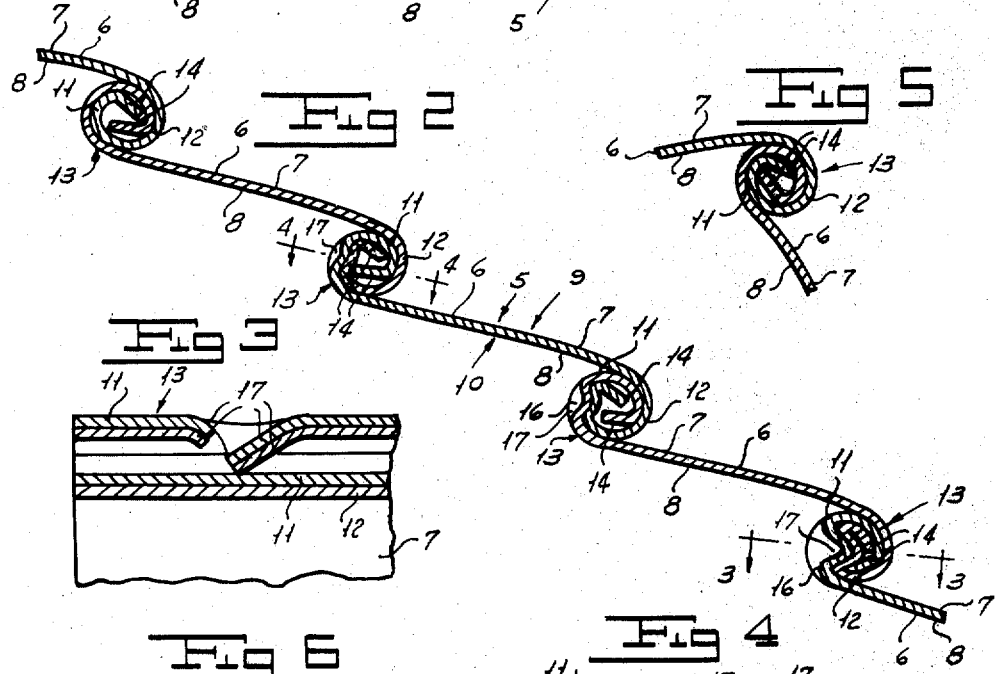
Fig 5
Fig 3
Fig 6
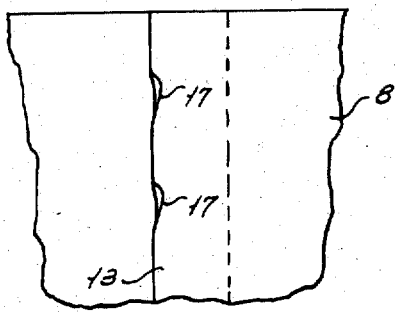
Fig 4
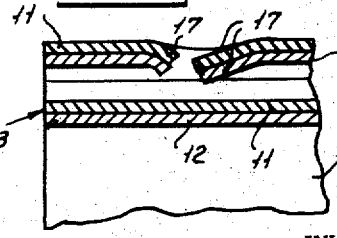
INVENTOR.
FRANK J. ZARNOWSKI
BY Robert F. Beck
ATTORNEY July 28, 1959 F. J. ZARNOWSKI Re. 24,675

AWNINGS

Original Filed April 29, 1954 2 Sheets-Sheet 2

INVENTOR.
FRANK J. ZARNOWSKI
BY Robert T. Beck
ATTORNEY

United States Patent Office

Re. 24,675
Reissued July 28, 1959

24,675

AWNINGS

Frank J. Zarnowski, Rutherford, N.J., assignor to Orchard Brothers Incorporated, a corporation of New Jersey Original No. 2,812,813, dated November 12, 1957, Serial No. 426,373, April 29, 1954. Application for reissue May 26, 1958, Serial No. 737,989

9 Claims. (Cl. 160—235)

Matter enclosed in heavy brackets [ ] appears in the original patent but forms no part of this reissue specification; matter printed in italics indicates the additions made by reissue.

My invention relates to awnings and more particularly to awning constructions wherein a plurality of slats are joined together in a manner to provide an awning of the fixed canopy or roll-up type.

One of the principal objects of my invention is to provide an awning construction wherein the slats are connected together along their lengthwise edges and are provided with means to preclude relative shifting of the slats lengthwise.

Another object of my invention is to provide an awning of the foregoing described character which may be readily rolled in a minimum of space.

A further object of my invention is to provide an awning of the foregoing described character capable of being equipped with means for maintaining the slats in a substantially rigid condition to form a canopy and which means is connected to and disposed solely beneath the under face of the canopy.

An important object of my invention is to provide an awning of the foregoing described character which is simple in construction, durable and efficient in use, economical in manufacture and wherein the slats may be assembled and secured together against lengthwise displacement by other than highly skilled labor.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

Figure 1 is an enlarged fragmentary bottom plan view illustrating interconnected slats in the operative or extended positions of an awning having my invention incorporated therein.

Figure 2 is a transverse sectional view taken on the line 2—2 of Figure 1.

Figures 3 and 4 are detail sectional views taken on the lines 3—3 and 4—4 of Figure 2, respectively.

Figure 5 is a detail longitudinal sectional view illustrating the manner in which a pair of the slats are pivoted relative to each other to permit roll-up of the awning.

Figure 6 is a fragmentary detail bottom plan view of a modification.

Figure 7:
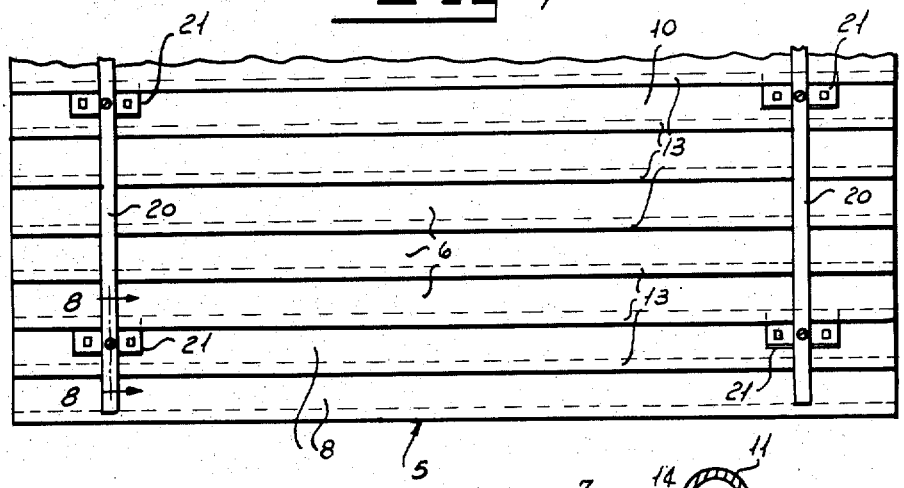

Figure 7 is a bottom plan view of the awning in extended condition and illustrating the slats being secured together in rigid relation with respect to relative transverse movement to provide an awning of the canopy type.

Figure 8:
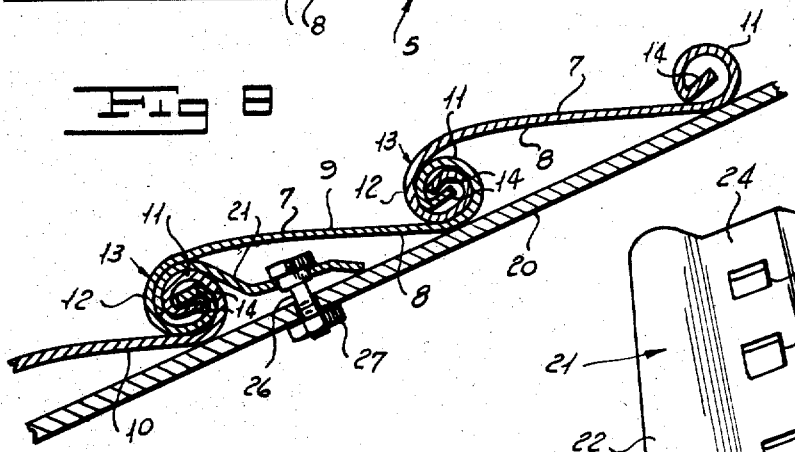

Figure 8 is an enlarged detail sectional view taken on the line 8—8 of Figure 7.

Figure 9:
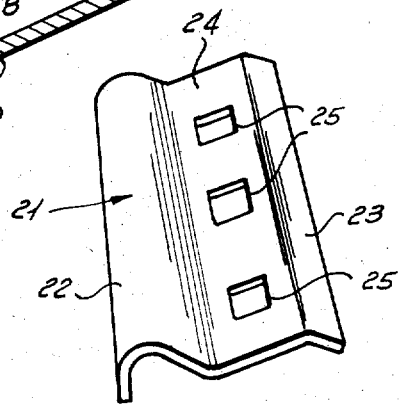

Figure 9 is a detail perspective view of an anchoring plate.

Figure 10:
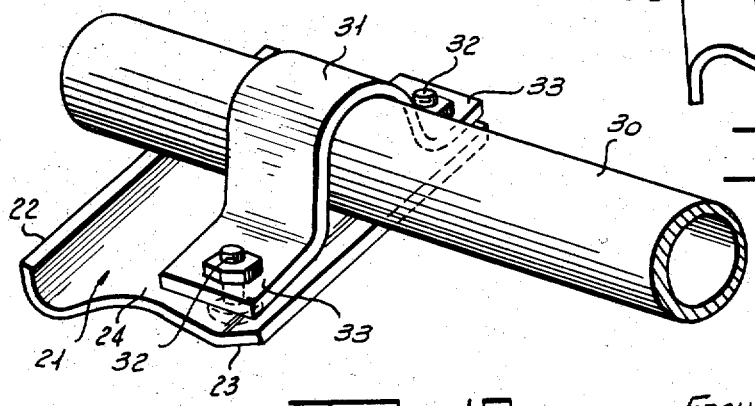

Figure 10 is a detail perspective view illustrating the manner of securing the plate to a cylindrical support.

In practicing my invention, as illustrated in the drawings, I provide an awning 5 comprising a pluraliay of relatively narrow slats 6 the body portions of which are each slightly recurvated in transversality and provided with upper and lower faces 7 and 8 defining the upper and lower surfaces 9 and 10 of the awning, respectively. The longitudinal margins of each slat terminate in upper and lower substantially spiral convolutions 11 and 12 disposed over and under the upper and lower faces of the slat. The upper and lower convolutions 11 and 12 of the slats are interconnected with the lower and upper convolutions 12 and 11 of the adjacent slats 6 to provide hinges 13 for pivotly connecting the slats together to permit roll-up of the awning or serving to maintain the slats in connected relation when the awning is utilized as a rigid canopy as disclosed in Figures 7 and 8 and hereinafter more fully described.

The inner or free ends of the convolutions 11 and 12 of each hinge 13 are formed with relatively straight portions or flanges 14 arranged to cooperate with each other to prevent relative pivotal movement of the slats 6 in one direction materially beyond the surface plane of the awning when the slats are in extended position, as shown in Figures 1 and 2, and to permit relative pivotal movement of the slats in the opposite direction, as shown in Figure 5, sufficient to enable the awning to be rolled up to an inoperative position. Inasmuch as this feature, per se, does not constitute the present invention, a more detailed disclosure thereof is not deemed necessary, an exemplification of the feature being disclosed in U.S. Patent No. 2,099,408.

In order to preclude relative shifting of the slats lengthwise, the portions 16 of the convolutions on the lee side of each hinge, in proximity to the ends thereof and subjacent the lower face of a connected slat, are bent inwardly toward the axis of the hinge to form coacting indentations, detents, protuberances or ajutments 17. [The] *As shown in the drawings, the overlying sections of the hinges have elongate indentations defining detents which extend lengthwise of the hinges. The indentations are generally U-shaped in transverse section and are of decreasing depth toward one end thereof. The underlying sections of the hinges have similar and correspondingly oriented indentations forming pockets which receive and confine the detents and prevent the slats from sliding relative to each other along the axes of the hinges while providing sufficient articulation of the hinges to permit rolling of the awning.*

*In the particular form of the invention shown in the drawing, the overlying hinge sections are cut or pierced transversely and the indentations 17 extend from and are of maximum depth at these cuts. Also, each indentation 17 is here shown as having two detents, one at each side of the cut. However, as perhaps best shown in Fig. 3, the detents at one side of the cuts are considerably deeper than the detents at the other sides of the cuts and it will be appreciated that the relatively deeper detents are primarily effective in holding the slats against relative longitudinal movement. As stated above, the underlying sections of the hinges are similarly formed with indentations 17 which are similar to and correspondingly oriented with respect to the indentations 17 in the outer hinge sections. In the particular form of the invention shown, the indentations 17 in the underlying hinge sections also are pierced or cut transversely and they also have detents at opposite sides of the cuts which pocket and confine corresponding detents in the outer hing sections. It will be appreciated in this connection, however, that the important thing is to form detents in the outer hinge sections and coacting indentations or*

*pockets in the inner hinge sections, the detents being of sufficient depth and size to lock the slats against relative longitudinal movement and formed and oriented in the hinges so as to permit sufficient articulation of the hinges to permit rolling of the awning.*

*Referring now once more to the particular form of the invention shown in the drawings it will be observed that the* detents 17 extend into the confines of the convolutions and in angular relation to the axis of the hinge 13. The detents 17 are formed or punched from the lower portions 16 by suitable means, for example, the tool disclosed in my copending application Serial No. 426,374, filed herewith, now Patent No. 2,748,866, granted June 5, 1956. The punching die assembly of the tool is so constructed and arranged as to form and effect bending of the detents into the confines of the convolutions and in somewhat transverse relation thereto. As shown in Fig. 3, the indentation 17 preferably has an opening therethrough with the detents extending in pairs towards such opening. One of the pairs of detents may be longer than the other. A detent of each convolution is disposed in paired and abutting relation with a detent of the adjacent convolution. Each pair is relatively slidable to permit the aforementioned pivotal movement of the slats during rolling of the awning and of a sufficient width for engagement with each other at all times to preclude substantial relative axial movement of the convolutions and slats. Obviously, from the foregoing, it will be apparent that I have provided anti-shifting means effective for preventing relative axial movement of the convolutions and whereby the ends of the slats are maintained in a preestablished order with respect to each other at all times.

As illustrated in Figures 7 to 10, inclusive, of the drawings, the slats 6 may be maintained in fixed relation against transverse shifting or roll-up to provide an awning of the rigid canopy type and, for this purpose, I provide a pair of spaced supporting members, for instance, bars 20, disposed under the lower faces of the slats and secured to a building or other structure from which the canopy extends. A plurality of anchoring plates 21 are employed for securing the slats to the bars 20 in fixed relation therewith. As depicted in Figures 8 and 9, each of the plates is formed with a pair of side portions 22 and 23, respectively, and an intermediate portion 24.

The intermediate portion 24 is relatively flat and is provided with a ternary of bolt-holes 25. The side portion 22 is angularly related to the portion 24 and of a substantially hooked-shaped configuration whereby the latter is disposed between convolutions 11 and 12 of the hinge 13, as clearly illustrated in Figure 8. The opposite side portion 23 is substantially flat and, being angularly related to the portion 24, extends in a somewhat general opposite direction with respect to the portion 22 and has its longitudinal free edge disposed in engagement with the bar 20. The bolt-holes 25 may be in the form of elongated slots for accommodating therein square-shaped head portions of bolts 26 to preclude turning of the bolts relative to the plates 21.

The bolts 26 extend through the center holes 25 of the plates 21 and the bars 20 and are provided with nuts 27 for tightening the bolts against the plates and thereby clamping the slats on the bars, it being understood that the plates are of a sufficient resiliency to maintain the hinges in engagement with the bars under tension thereby securing the slats to the bars in a fixed condition to form a rigid canopy.

In instances where tubular or cylindrical members are employed in lieu of the bars 20, each of the plates 21, as illustrated in Figure 10, may be secured to a particular cylindrical member 30 by a U-clip 31 embracing the member 30 and having bolts 32 extending through its angularly-related end sections 33 and the outermost holes 25 of the plate 21 to secure the plate to the member in the same tensioned relation therewith as in the instance of the bars 20 heretofore disclosed.

It is to be noted that the detents are formed beneath the slats and substantially opposite from the weather or exposed sides of the hinges whereby the openings occasioned by the forming of the detents are concealed from view from without the awning, thus enabling the upper or outer faces of the slats to present a smooth and attractive appearance not marred by indentations, openings, bolt heads, etc. The lower or inner face of the awning also is attractive because the detents are disposed in zones which face in directions at angles to the directions in which the inner surfaces of the body portions of the slats face. Furthermore, while I have disclosed my invention in connection with slats preferably constructed of aluminum or the like, it is to be distinctly understood that the invention may be practiced in conjunction with slats constructed of other suitable and desirable materials. Also, it is comprehensible that the invention may be employed in connection with similar constructions other than the slats of awnings, for instance, panel assemblies for walls or the like wherein it is desirable to secure paneling against relative shifting. As clearly shown in Figure 6, groups of the detents 17 may be formed at each of the ends of the hinges whereby the detents of all of the groups coact to insure the slats against relative lengthwise shifting.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined solely to the use herein disclosed in connection therewith as it may be utilized for any purpose to which it is adaptable. It is therefore to be understood that the invention is not limited to the specific construction as illustrated and described, as the same is only illustrative of the principles involved which are capable of extended application in various forms, and the invention comprehends all construction within the scope of the appended claims.

What I claim is:

1. In an awning, a plurality of slats arranged in adjacent parallel relation to each other, coiled portions located at opposite longitudinal edges of said slats and extending substantially the full lengths thereof, the coiled portions of each slat extending in opposite directions and being interconnected with the coiled portions of adjacent slats to form hinges whereby said slats are pivotally connected with each other, each of said hinges having a zone in which a first one of the interconnected coil portions is disposed within and in face-to-face contact with the other of the interconnected coil portions, said first one of the interconnected coil portions having an opening therein in said zone and intermediate its ends, said first portion being bent inwardly toward the axis of the hinge adjacent opposite sides of said opening to form two detents extending lengthwise of the hinge in opposite directions and terminating at said opening, and the other of said interconnected coil portions having an opening and two detents conforming in position, size and shape to said opening and said two detents in said first portion, whereby the detents of said first portion and of said other portion are disposed substantially in face-to-face contact to prevent longitudinal sliding movement of said interconnected portions relative to each other.

2. In an awning, a plurality of slats arranged in adjacent parallel relation to each other, coiled portions located at opposite longitudinal edges of said slats and extending substantially the full lengths thereof, the coiled portions of each slat extending in opposite directions and being interconnected with the coiled portions of adjacent slats to form hinges whereby said slats are pivotally connected with each other, each of said hinges having a zone in which a first one of the interconnected coil portions is disposed within and in face-to-face contact with the other of the interconnected coil portions, said first one of the interconnected coil portions having an opening therein in said zone and intermediate its ends, said first portion being bent inwardly toward the axis of the hinge adjacent opposite sides of said opening to form two detents extending lengthwise of the hinge in opposite directions and terminating at said opening, said detents extending different distances inwardly of said hinge, and the other of said interconnected coil portions having an opening and two detents conforming in position, size and shape to said opening and said two detents in said first portion, whereby the detents of said first portion and of said other portion are disposed substantially in face-to-face contact to prevent longitudinal sliding movement of said interconnected portions relative to each other.

3. In an awning having inner and outer faces, a plurality of slats having body portions arranged in adjacent parallel relation to each other, coiled portions located at opposite longitudinal edges of said slats and extending substantially the full lengths thereof, the coiled portions of each slat extending in opposite directions and being interconnected with the coiled portions of adjacent slats to form hinges whereby said slats are pivotally connected with each other, each of said hinges having a zone in which a first one of the interconnected coil portions is disposed within and in face-to-face contact with the other of the interconnected coil portions and in which said other of the interconnected coil portions is exposed on the inner surface of said awning but faces in a direction different from that in which the inner surfaces of body portions of said slats face, said first one of the interconnected coil portions having an opening therein in said zone and intermediate its ends, said first portion being bent inwardly toward the axis of the hinge adjacent opposite sides of said opening to form two detents extending lengthwise of the hinge in opposite directions and terminating at said opening, and the other of said interconnected coil portions having an opening and two detents conforming in position, size and shape to said opening and said two detents in said first portion, whereby the detents of said first portion and of said other portion are disposed substantially in face-to-face contact to prevent longitudinal sliding movement of said interconnected portions relative to each other.

4. In an awning, a plurality of slats arranged in adjacent parallel relation to each other, coiled portions located at opposite longitudinal edges of said slats and extending substantially the full length thereof, each of said coiled portions having a circumferential extent less than one full turn about the axis thereof and having a straight end portion extending along the entire length thereof, the coiled portions of each slat extending in opposite directions and being interconnected with the coiled portions of adjacent slats to form hinges whereby said slats are pivotally connected with each other, each of said hinges being free of obstruction to relative movement between the connected convolutions except in a zone in which a first one of the interconnected coil portions is disposed within and in contact with the other of the interconnected coil portions, said first one of the interconnected coil portions having an opening therein in said zone and intermediate its ends, said first portion being bent inwardly toward the axis of the hinge adjacent opposite sides of said opening to form two detents extending lengthwise of the hinge in opposite directions and terminating at said opening, and the other of said interconnected coil portions having an opening and two detents conforming in position, size and shape to said opening and said two detents in said first portion, whereby the detents of said first portion and of said other portion are disposed substantially in face-to-face contact to prevent longitudinal sliding movement of said interconnected portions relative to each other.

*5. An awning comprising a plurality of metal slats arranged side by side and provided with rolled interfitting marginal portions forming hinges having overlying and underlying hinge sections, the overlying sections of the hinges having elongate indentations defining detents extending lengthwise of said hinges, said indentations being generally* U-*shaped in transverse section and of decreasing depth toward one end thereof, the underlying sections of the hinges having similar and correspondingly oriented indentations forming pockets receiving and confining said detents to prevent said slats from sliding relative to each other along the axes of the hinges while permitting sufficient articulation of the hinges to permit rolling of the awning.*

*6. An awning comprising a plurality of metal slats arranged side by side and provided with rolled interfitting marginal portions forming hinges having overlying and underlying hinge sections, said overlying hinge sections being cut transversely and formed with indentations defining detents at one side of and extending from said cuts lengthwise of said hinges, said indentations being generally* U-*shaped in transverse section, of maximum depth at said cuts and decreasing in depth from said cuts, said underlying hinge sections having cooperating correspondingly disposed and oriented indentations forming pockets receiving and confining said detents to prevent said slats from sliding relative to each other along the axes of the hinges while permitting sufficient articulation of the hinges to permit rolling of the awning.*

*7. An awning comprising a plurality of metal slats arranged side by side and provided with rolled interfitting marginal portions forming hinges having overlying and underlying hinge sections, said overlying hinge sections being cut transversely and formed with indentations defining detents at opposite sides and extending from said cuts lengthwise of said hinges, said detents being generally* U-*shaped in transverse section, of maximum depth at said cuts and decreasing in depth from said cuts, said underlying hinge sections having cooperating correspondingly disposed and oriented indentations forming pockets receiving and confining said detents to prevent said slats from sliding relative to each other along the axes of the hinges while permitting sufficient articulation of the hinges to permit rolling of the awning.*

*8. An awning comprising a plurality of metal slats arranged side by side and provided with rolled interfitting marginal portions forming hinges having overlying and underlying hinge sections, the overlying section of each hinge being cut transversely adjacent the ends thereof and formed with indentations defining detents extending from said cuts at opposite sides thereof and lengthwise of said hinge, said detents being generally* U-*shaped in transverse section, of maximum depth at the cuts and decreasing in depth from said said cuts, the underlying section of each hinge having correspondingly disposed and oriented indentations forming pockets receiving and confining said detents to prevent said slats from sliding relative to each other along the axes of the hinges while permitting sufficient articulation of the hinges to permit rolling of the awning.*

*9. An awning comprising a plurality of metal slats arranged side by side and provided with rolled interfitting marginal portions forming hinges having overlying and underlying hinge sections, said overlying hinge sections being cut transversely, said cuts being disposed at the underside of the awning and facing generally in the plane of the awning, indentations defining detents being formed in said overlying hinge sections at one side of and extending from said cuts lengthwise of said hinges, said detents being generally* U-*shaped in transverse section, of maximum depth at said cuts and decreasing in depth from said cuts, said underlying hinge sections having correspondingly disposed and oriented indentations form-*

*ing pockets receiving and confining said detents to prevent said slats from sliding relative to each other along the axes of the hinges while permitting sufficient articulation of the hinges to permit rolling of the awning.*

References Cited in the file of this patent or the original patent

UNITED STATES PATENTS

| | | |
|---|---|---|
| 162,250 | Moore | Apr. 20, 1875 |
| 430,000 | Clark | June 10, 1890 |
| 638,554 | Burton | Dec. 5, 1899 |
| 949,789 | Wilson et al. | Feb. 22, 1910 |

| | | |
|---|---|---|
| 1,487,242 | Howle | Mar. 18, 1924 |
| 1,891,767 | Ketcham | Dec. 20, 1932 |
| 1,936,909 | MacChesney | Nov. 28, 1933 |
| 2,099,408 | Packert et al. | Nov. 16, 1937 |
| 2,295,194 | Atkinson | Sept. 8, 1942 |
| 2,378,655 | Popp | June 19, 1945 |
| 2,467,969 | Debrot | Apr. 19, 1949 |
| 2,569,621 | Toney | Oct. 2, 1951 |

FOREIGN PATENTS

| | | |
|---|---|---|
| 642,525 | France | May 5, 1928 |
| 291,685 | Great Britain | June 7, 1928 |